Jan. 26, 1954     I. B. LASKOWITZ     2,667,227
VARIABLE SPEED COUNTER-ROTATING ROTOR SYSTEM
FOR HELICOPTERS AND CONTROL MEANS THEREFOR
Filed Jan. 12, 1948     3 Sheets-Sheet 1
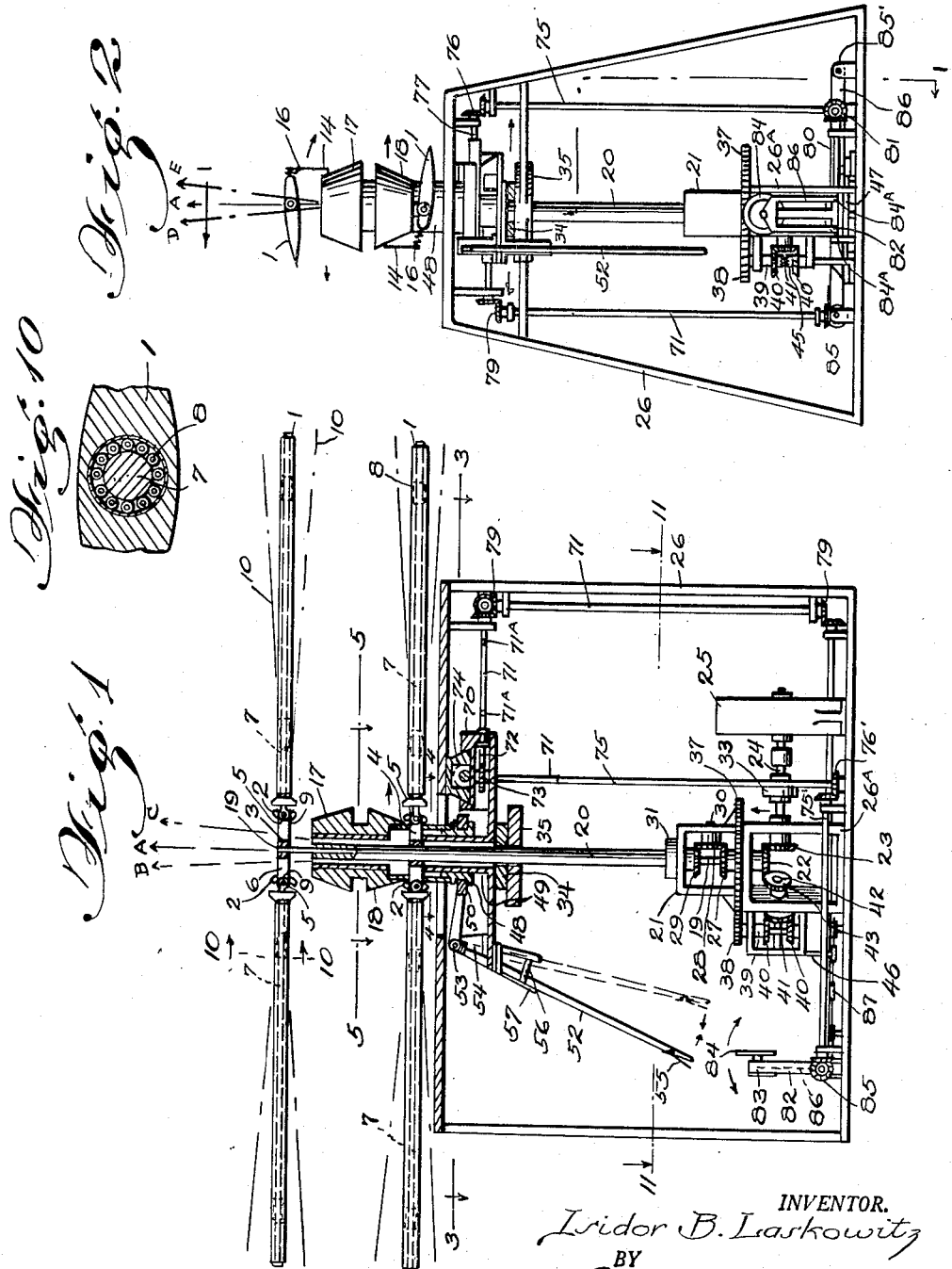
INVENTOR.
Isidor B. Laskowitz
BY
Robert I. Dennison
ATTORNEY

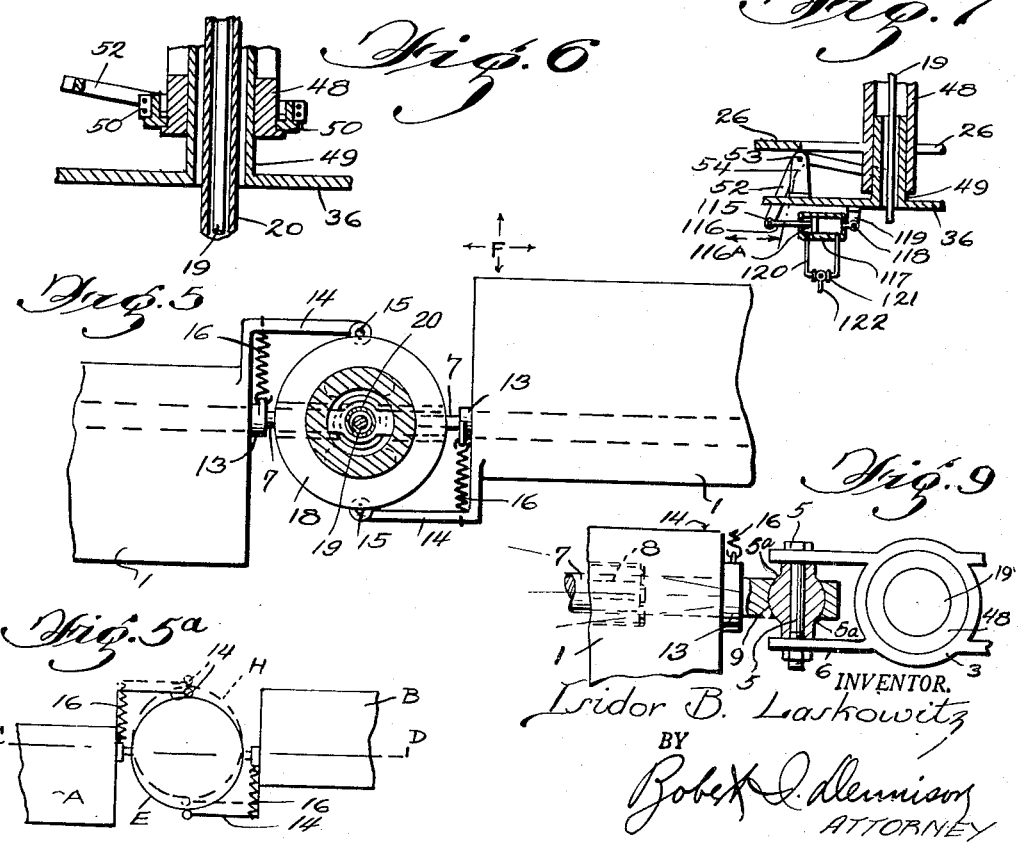

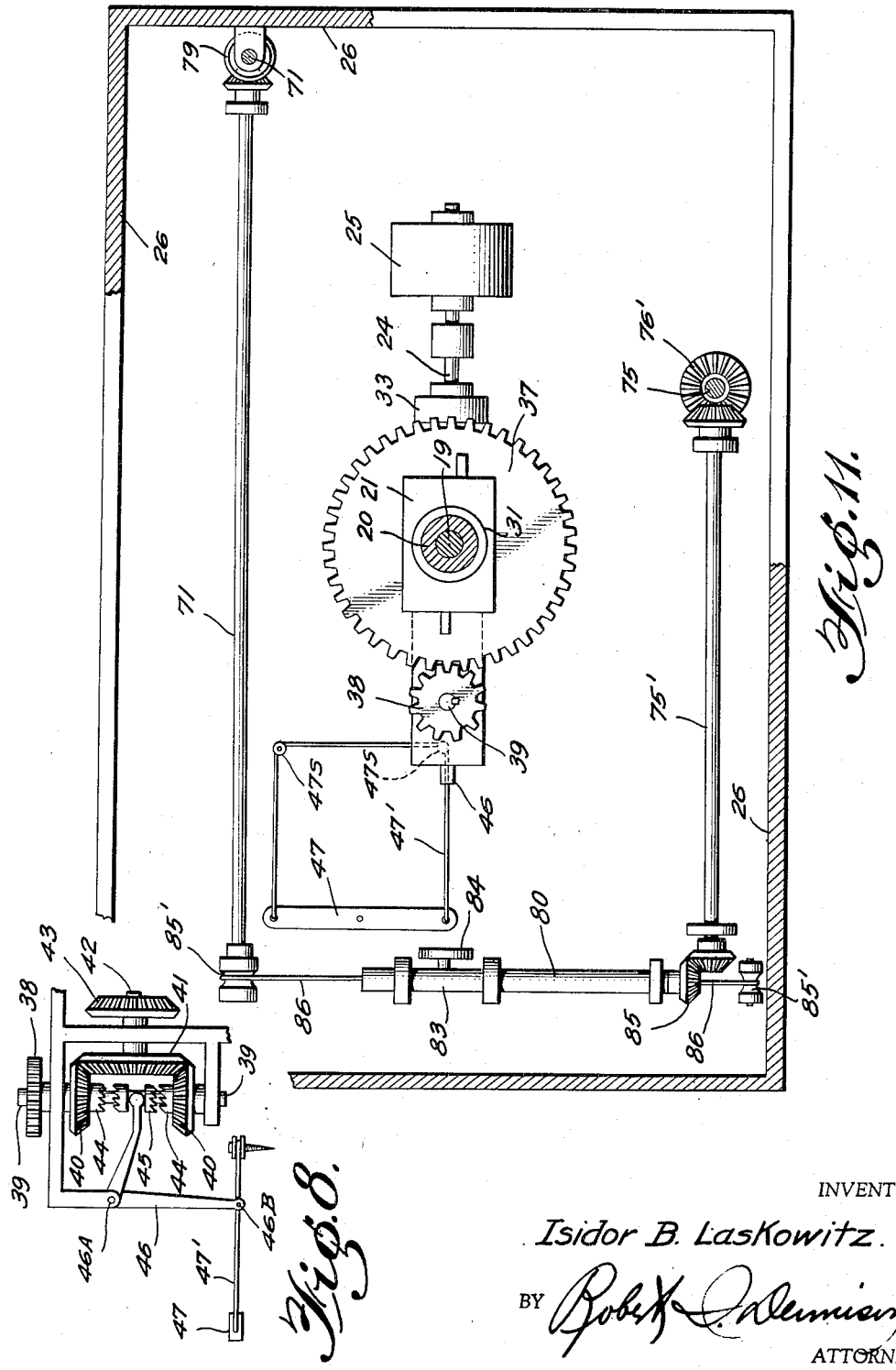

Patented Jan. 26, 1954

2,667,227

UNITED STATES PATENT OFFICE 2,667,227

VARIABLE SPEED COUNTER-ROTATING ROTOR SYSTEM FOR HELICOPTERS AND CONTROL MEANS THEREFOR

Isidor B. Laskowitz, Brooklyn, N. Y.

Application January 12, 1948, Serial No. 2,033

7 Claims. (Cl. 170—135.24)

This invention relates to a variable speed counter-rotating rotor system for helicopters and control means therefor, and embodies certain improvements in a Tiltable Counter-Rotating Rotor System for Helicopters and Control Means Therefor, as covered by my copending application bearing Serial Number 471,492, filed January 6, 1943, which is now United States Letters Patent No. 2,434,276, granted to me January 13, 1948. Reference is made to my copending application, Serial Number 2,034, filed January 12, 1948, now abandoned, for a Variable Pitch Counter-Rotating Rotor System for Helicopters and Control Means Therefor.

It is a primary object of this invention to provide such mechanisms as will readily and easily provide for ascent, descent, movement to the right or left, forward or rearward of the aircraft; provide for hovering or suspension in the air without movement relative to the ground; provide controlling or adjusting mechanisms for maintaining lateral balance or stability and for maintaining longitudinal balance or stability; provide for steering or directional movement about the vertical axis of the aircraft; obtain autorotation of the lift mechanisms by providing "free-wheeling" thereof should the prime mover or motor fail, thus effecting descent safely without power in case such an emergency should arise.

Another object of the invention is to provide mechanisms and arrangements having all the qualifications above noted and yet be of such a compact nature as to occupy a small operating area horizontally and eliminating all auxiliary propellers, rotors or other devices.

A further object of the invention resides in the provision of variable thrust mechanisms by means of which the direction of thrust may be varied to provide a vertical and horizontal component in any direction of the compass without rotation of the aircraft about its vertical axis.

Another object of the invention contemplates variable thrust mechanism whereby direction and intensity of thrust may be varied to provide a vertical and horizontal component in any direction of the compass without inclining the axis of the rotors and concurrently effect control, at will, movement of the aircraft about its vertical axis for steering movement either clockwise or counterclockwise.

A further object is to provide variable thrust mechanisms embodying a pair of coaxially arranged rotors comprising blades having their inner ends hinged to move in opposite directions whereby to normally balance out the reaction torques set up by each rotor and yet, at will vary the speed of one rotor with respect to the other to the extent that the reaction torques may differ to establish desired control of the aircraft about the vertical axis.

Another important object of the invention is to embody the features of variable thrust mechanism having the qualities set out above which will be relatively simple in construction yet positive in action, strong and durable with parts arranged to facilitate ready and easy adjustments whenever necessary, thus assuring its practicability.

Other objects and advantages of the present invention will become apparent from the following detailed description of preferred embodiments of the invention illustrated in the accompanying drawings wherein like reference characters designate corresponding parts throughout the several views and wherein:

Figure 1 is a vertical section of the variable thrust mechanism embodying the invention taken substantially along line 1—1 of Figure 2;

Figure 2 is an end elevation of the mechanism shown in Figure 1;

Figure 3 is a horizontal section taken substantially along the line 3—3 of Figure 1;

Figure 4 is a fragmentary horizontal section taken along the line 4—4 of Figure 1;

Figure 5 is a fragmentary horizontal section taken along the line 5—5 of Figure 1;

Fig. 5A is a schematic fragmentary plan view showing the control of the cones and blades by the eccentric bracket control means;

Figure 6 is a fragmentary vertical section taken along the line 6—6 of Figure 4;

Figure 7 is a fragmentary vertical section showing another arrangement for the operation of the lever to change the pitch angles of the blades;

Figure 8 is an enlarged detail view showing the clutch structure and connected parts including the cable and levers connected thereto;

Figure 9 is an enlarged fragmentary plan view, partly in section, showing the pivotal connection of the inner end of one blade with its collar;

Figure 10 is a cross sectional view through one of the airfoils, vanes or blades, taken on the line 10—10 of Figure 1, illustrating the roller bearings associated with the shaft on which the airfoil, vane or blade is mounted; and Fig. 11 is a horizontal section on a larger scale taken on the line 11—11 of Fig. 1 looking downwardly as indicated by the arrows.

Referring now more particularly to the drawings, the preferred embodiments are illustrated as embodied in helicopters wherein airfoils, vanes or blades 1 constructed of any suitable or preferred materials constitute the rotors. Each blade is pivotally mounted at its inner end on a pin 5, upper rotor pins 5 being carried by a support or collar 3 while a support or collar 4 carries the pins for the lower rotor. Pivotal movement of the blades about their respective pins above and below a limited predetermined angle is controlled by means of the upper and lower limit stops 2 forming part of the arm 6 which are secured to the collars 3 and 4. Each blade 1 is pivotally mounted on the shafts or spars 7 by means of the ball or roller bearings 8. The inner ends of the shafts or spars 7 are carried on spherical surfaces 9 carried by pins 5 as is more clearly shown in Figure 9 of the drawings. The spherical surfaces 9 provide for small movement in a horizontal plane of the shafts 7 and consequently the blades 1 about the center of the pins 5.

Referring to Figure 9, the ends 5a of the spherical surface 9 serve as stops to limit the movement of the blades in a horizontal plane. The blades 1 are thus free to move in a vertical plane between the stops 2 to the extent shown by the dotted lines 10 in Figure 1 and free to move in a horizontal plane between stops. Collars 13 secured to shafts 7 at both ends prevent longitudinal movement of the blades 1 on the shafts 7. Secured to the blades 1 at their inner ends are the arms 14 terminating with rollers 15 at their extremities. Rollers 15 through the action of the springs 16 on the arms 14 are kept in contact with the upper blade pitch angle changing cone 17 and the lower blade pitch angle changing cone 18. Thus, when rotating, the pitch angle or angles of incidence of the blades of the upper and lower rotors depend on the position of the cones 17 and 18, respectively.

While two blades 1 are shown for each rotor, a greater number of blades may be employed without departing from the spirit of the invention. All parts fixedly secured together are preferably welded to each other although any other method of rigidly securing the members may be employed as desired.

While two sets of rotors preferably employed as illustrated in Figures 1 and 2, the upper rotor is carried by a vertical shaft 19 rotatably mounted within a tubular member 20 which carries the lower rotor, thus providing for coaxial support of the rotors.

In Figures 1 and 2, shaft 19 extends into and through a gear housing 21 and is rotatable therein. The lower end of shaft 19 is connected to a bevel gear 22. Gear 22 meshes with a similar gear 23 carried on the drive shaft 24 of an engine or motor 25 mounted on the base of the supporting frame 26. A gear bracket 26A is provided for supporting shafts 19 and 24 and bevel gears 22 and 23. Shaft 19 is keyed or feathered to gear 27 carried in gear housing 21. This gear 27 is connected by means of idler gear 28 to gear 29 which is suitably secured to the lower end of the tubular member 20, idler gear 28 being carried by pin 30. Gears 27, 28 and 29 are freely rotatable within the gear housing 21 and may be submerged in a suitable lubricant retained in the housing. A thrust collar 31 is carried by the sleeve or tubular member 20.

It will be obvious that when shaft 19 and its associated upper rotor are rotated in one direction, tubular member 20 and its associated lower rotor will be rotated in an opposite direction through the medium of the differential gearing described.

An automatic declutching or "free-wheeling" device 33 of any suitable or preferred type is interposed between the engine or motor 25 and bevel gear 23 whereby the vertical shaft 19, tubular section 20 and the rotors mounted thereon are free to rotate when the engine or motor is not functioning. A standard brake mechanism of any suitable or preferred type (not shown) may be associated with the vertical driving shafting to prevent or retard its rotation when desired, or when the engine or motor is not operating. When the engine or motor is operating, power will be transmitted through the vertical shafting to the rotors, the latter revolving at such speed as may be desired by the pilot by merely adjusting the throttle controlling the engine or setting the brake hereinbefore noted.

Figure 5A illustrates the movement of the cones 17 and 18 and the tilting of the blades 1 to produce a selected blade pitch angle thereby producing effects as though the rotor and its shaft were inclined or tilted in addition to having other advantages which is not afforded by the tiltable rotor. In Figure 5A the blade positions A and B are represented in full lines. The cone shown is in a full line position E and its moved position by the dotted line H. The cones 17 and 18 can be moved off center but the shafts are not moved off center an appreciable amount beyond that of their bearing supports. The arms 14 are movable from a full line position to a dotted line position as shown. The displacement angle or pitch angle of the blades 1 is accomplished in a manner contemplated and displayed in Figure 5A. Since the blades 1 are capable of hinging about the line C—D and are kept in contact with the cone by means of the action of the springs 16 on the arms 14, when the blades are rotating, the pitch angles of the blades 1 are the same, and hence, the lift force on each blade is the same or equal. The result of these two equal lift forces on each blade is to produce a vertical thrust on each rotor shaft. Now, with the center of the rotor in the same position as before, upon movement of the eccentric bracket, and hence the cone, to the dotted eccentric position as indicated at H. In this position the pitch angle of blade 1 (marked A) has been increased, while the pitch angle of blade 1 (marked B) has been decreased, and as a result the lift force on blade A, is greater than that of blade B. The result of these two unequal lift forces on the blades, is to produce a resultant thrust on the rotor, inclined in the direction from A to B. In similar manner, moving the center of the cone in any other eccentric position in a horizontal plane, has the effect of inclining the direction of the resultant thrust of the rotor, in the direction desired.

An intermediate steady bearing 34 is provided for tubular shaft 20, and is mounted on frame member 35. Bearing 34 also serves to give additional support to the eccentric bracket 36 hereinafter described.

Figure 9 discloses, on an enlarged scale, the means whereby the inner ends of the blades 1 are connected individually to their collar supports as 3. Each collar is provided with arms 6 receiving between them a member having a spherical portion 9. The inner end of each spar or shaft 7 is provided with a socket having spherical portions receiving and engaging the spherical portion 9. Each member is secured in position by a bolt 5.

Each shaft 7 and its blade is provided with antifriction bearings as indicated at 8.

Referring more particularly to Figures 1, 2 and 3, the lower part of gear housing 21 has secured thereto a gear 37 which meshes with gear pinion 38 mounted on vertical shaft 39 whereby rotation of the latter shaft will impart rotation to the gear housing 21 and such rotation in either direction may be transmitted as it is imparted to shaft 39. It will be understood that with gear housing 21 remaining stationary, when the engine or motor 25 is operating, the upper and lower rotors will revolve in opposite directions at the same speed and consequently the reaction torques of the rotors will balance each other, thereby eliminating any tendency for the mechanism to rotate about its vertical axis.

On the other hand, with the two sets of rotors operating under motive power, if gear housing 21 is rotated in either direction, the speed of the lower rotor would correspondingly be varied. Thus, it may be possible to set up in the lower rotor a reaction torque which is greater or less than the reaction torque of the upper rotor and the difference in the reaction torques will cause the craft to rotate about its vertical axis in a clockwise or counterclockwise direction depending on the directional rotation of shaft 39.

Shaft 39 has rotatably mounted at its lower end, opposed spaced bevel gears 40 (Figures 1, 2 and 8) which are enmeshed with gear 41 driven by the engine or motor 25 through shaft 42, and bevel gear 43 (see Figure 1) driving off gear 22. Inner end faces of gears 40 are provided with clutching portions 44 of the frictional or tooth type adapted to be engaged by a slidable clutching member 45 suitably provided at its outer ends with cooperating corresponding clutching portions complementary to portions 44. Slidably clutching member 45 is keyed or splined to shaft 39. With member 45 in a neutral position, shaft 39 and hence pinion 38 is immobilized.

Referring now more particularly to Figure 8. However, should this member 45 be shifted to engage upper bevel gear 40 by means of clutch shift lever 46 which is pivoted at pin 46A responding to movement of steering foot lever 47 which is connected by means of wire rope to end 46B of lever 46, shaft 39 will be caused to move in one direction, while shifting of foot lever 47 in the opposite direction will cause member 45 to engage lower gear 40, thus imparting rotation of shaft 39 in the opposite direction. Steering foot lever 47 is connected to lever 46 by means of wire rope or cable 47', sheaves 47s and turnbuckles as in conventional aircraft. Thus, it will be seen that a single control has been provided to retain gear housing 21 stationary or to cause it to rotate clockwise or counterclockwise as the case may be.

Upper and lower blade pitch angle changing cones (frustum of) 17 and 18 are carried by cylindrical support 48 which revolves with the arms 6 of the lower rotor and is slidably and rotatably mounted on the neck portion 49 of the eccentric bracket 36. Encircling the cone support 48 at its lower end is the non-revolving split collar 50. Engaging collar 50 by its pins 51 is the lever 52 pivotally mounted on the pin 53 between the bracket arms 54 secured to the eccentric bracket 36. The lever 52 is provided with a spring actuated pilot lever 55 which engages the toothed quadrant 56 for definite settings of the lever 52. High and low limit stops 57 are provided on the quadrant 56 for limiting the high and low positions of the cones 17 and 18. In the arrangement described, it is possible with the rotors and cones rotating to raise and lower the cones or set them in any desired position by shifting lever 52 backward or forward.

The effect of raising the cones 17 and 18 is to simultaneously increase the pitch angles of the blades of the upper and lower rotors and consequently to increase the lift or thrust of the rotors. Lowering the cones 17 and 18 has the reverse effect.

Neck portion 49 of eccentric bracket 36 is concentrically shown on the drawings with respect to the vertical shaft 19 which carries the upper rotor and the tubular member 20 which carries the lower rotor. In this position, for any given setting of the cones 17 and 18 of the lever 52, the pitch angles of the blades of the upper and lower rotors when rotating, will be the same. However, if the neck portion 49 is moved in a horizontal plane off center the pitch angles of the blades of the upper and lower rotors are varied from a maximum to a minimum in every complete revolution. This eccentricity produces a sinusoidal variation of the pitch angles of the blades of both rotors during each revolution and may be utilized to vary the lift or thrust of the rotors in any direction of the compass. The effect is the same as inclining the axis of the rotors.

For the purposes of moving the center "F" of the neck portion 49 of eccentric bracket 36 in a horizontal plane, I prefer to employ the wheel and rocking bridge control mechanism together with one of the eccentric brackets more fully and specifically described and claimed in United States Letters Patent No. 1,872,758 granted to me August 23, 1932, for Variable Thrust Mechanism.

Briefly, such mechanism may be applied in the present disclosure by carrying neck portion 49 in an upright position on eccentric bracket 36. The latter is slidably carried on a slotted member 70 and may be moved fore and aft as viewed in Figure 1, by rotating shafting or spindle 71 threaded at its end at 72 and extending through a threaded boss 73 carried by the eccentric bracket 36. Slotted member 70 is in turn slidably mounted on the frame member 74 secured to frame 26. This arrangement provides for lateral movement at right angles to the direction of movement possible in Figure 1, as will be apparent from Figure 2, such movement being responsive to rotation of shaft 75. Bevel gears 76 and 76' which operatively connect shaft 75 with a threaded spindle 77 which is in turn associated with an internally threaded boss 78 (Fig. 3) provided in the slotted member 70.

Bevel gears 79 provide driving connections between the various sections of the shafting 71 for transmitting rotary motion from each section to the next. Near the ends of upper shaft section 71 there are provided universal joints 71A to allow for its inclination whenever the eccentric bracket 36 is moved from side to side. Shaft section 75' of the shafting 75 is driven by the hollow shaft 80 (Figs. 1 and 3) by means of bevel gears 81. Attached to the inner end of the shaft 80 is an inverted U-shaped rocking bridge 82. A suitable grooved flexible cable drum 83 is mounted at the top of the bridge 82 and is adapted to be turned by a hand control wheel 84. Adjacent to the bottom of the rocking bridge, there are provided a pair of pulleys or guide sheaves 84A. Shaft section 71 is adapted to extend along the bottom of frame 26 toward the rocking bridge and has a grooved drive pulley 85 secured thereto. A similar grooved pulley 85', but acting only as an idle pulley, is disposed in opposed relation to pulley 85. A flexible cable 86 of wire rope preferably, is wound around the drum 83, sheaves 84A, through hollow shaft 80 and around pulleys 85 and 85'. The ends of the cable are preferably secured by a turnbuckle 87 for the purpose of adjustment when necessary.

As will be evident, the construction and arrangement is such that by turning control wheel 84 in one direction eccentric bracket 36 will move to one side or the other as indicated by arrows in Figure 1, depending upon the direction of rotation of the wheel. Also, by inclining the rocking bridge 82 or dipping it fore and aft, the eccentric bracket is moved in opposite directions at right angles to the previously described movement in the direction of the arrows illustrated in Figure 2. Thus, it is possible to vary the lift or thrust of the mechanisms in any direction, such as from the vertical position "A" to any other position, for example, as "B," "C," "D" or "E" as illustrated in Figures 1 and 2. The resultant thrust in position "B" would cause forward translation of the craft; in position "C" movement would be to the rear; in position "D" movement would be sidewise to the left; in position "E" sidewise to the right. By varying the thrust or lift from position "A" to either "B" or "C" longitudinal stability or control may be had, while shift to positions "D" or "E" provides for lateral stability or control. With rotation of the craft about its vertical axis by means of rotation of gear housing 21, stability and control of the craft about all three axes is obtained.

The wheel and rocking bridge control mechanism is so arranged that movement of the wheel 84 to the right would correspond to a movement of the craft to the right and a movement of the wheel to the left would correspond to a movement of the craft to the left. Also, that a forward inclination of the rocking bridge 82 would correspond with a forward movement of the craft and that a rearward inclination of the bridge would correspond to a rearward movement of the craft.

Variable thrust mechanisms of the character described may be applied to land or water craft or to any other type of craft in which it may be useful. The compactness of the arrangements is such as to readily lend itself to use in a confined area both as to craft and the space which may be available for operation of the craft. It will be clear that all controls are approximately disposed and are of a positive acting nature so as to avoid any element of failure of operation and control.

Referring to Figure 7, the lever 52 for changing the pitch angles of the blades is not extended within reach of the pilot as shown in Figure 1, instead, the lower end of the shortened lever 52 engages the pivoted end 115 of the piston rod 116 secured to a piston 116A, which slides in the cylinder 117. Cylinder 117 is pivotally supported at one end by means of the pin 118 and the bracket 119 which is secured to the eccentric bracket 36. The ends of the cylinder 117 are connected by means of the flexible pipes 120 to a pilot control lever valve 121 which is located within easy reach of the pilot. A pneumatic or hydraulic source with supply and drain lines (not shown) is attached to the valve 121 which is controlled by movement of the lever 122, in such a manner that the fluid (air or oil) is in communication with the cylinder to actuate the piston 116A in either direction so that the position of the lever 52 may be controlled to produce any desired setting of the pitch angle of the blades 1.

*Operation of the system.*—With the wheel 84 and rocking bridge 82 in a vertical and central position, the lever 52 in its forward position and foot lever 47 in a central position as shown on the drawings, the cones 17 and 18 are in a concentric position with relation to the rotor shafts 19 and 20 and in their lowest position. In this position, cone 17 is in such relationship to cone 18 that the pitch angles of the blades of the upper and lower rotors are the same and at a small angle of incidence suitable for an autorotative landing.

The engine 25 is started and as a consequence the upper and lower rotors revolve in opposite directions. More engine throttle and the rotors revolve at a higher speed. The lever 52 is moved rearward and hinging about pin 53, the end engaging pins 51 move up and as a result both cones 17 and 18 are raised. The rollers 15 being in contact with the cones, are moved outwardly on the upper rotor and inwardly on the lower rotor with the result that the pitch angles of all the blades are increased simultaneously or collectively by an equal amount, and the helicopter will rise vertically. To hover, the proper adjustment must be made of the engine throttle and the lever 52. To descend, the reverse operation is carried out.

Having risen to a given height and desiring to move in a forward direction, the rocking bridge 82 is tilted in a forward direction. The effect of this is to turn shaft 80 and through the bevel gears 81, the shafts 75', 75 and threaded spindle 77 are also turned. The result of this is to move slotted member 70 and eccentric bracket 36 to the right of the operator. Since the cones are mounted on the eccentric bracket, the cones also will be moved off center to the right. Referring to Fig. 5 and Fig. 5A, the effect of this movement is to increase the pitch angles of the rearward blades of the rotors as they revolve and decrease the pitch angles of the forward blades. The lift on the rearward blades being greater than that on the forward blades, the craft will assume an inclined forward attitude and will move forward. Tilting the rocking bridge 82 rearward will reverse the sequence and the craft will move rearward. This variation of the blade pitch angle as the rotors revolve is called sinusoidal or cyclic pitch change. Turning the wheel 84 to the right will through the action of the pulley 85 and cable 86 turn shafts 71 and threaded spindle 72 and as a consequence eccentric bracket 36 and the cones will be moved off center to the rear. Again referring to Fig. 5 and Fig. 5A the effect of this movement is to increase the pitch angles of the blades as they assume a position on the left of the operator and decrease the pitch angles when they assume a position on the right side. The lift on the blades being greater on the left side, the craft will incline toward the right and move to the right. Turning the wheel 84 to the left will reverse the process and cause the craft to move to the left.

Pushing on foot lever 47 with the right foot will through the action of the wire rope or cable 47' and sheaves 47s move the end 46B of clutch shift lever 46. Lever 46 being pivoted at pin 46A will shift slidable clutching member 45 and engage lower bevel gear 40. As a consequence of this, shaft 39 will rotate and through pinion 38 and gear 37, gear housing 21 will also be made to rotate. The speed of lower rotor shaft 20 has been reduced by an amount equal to the speed of the gear housing 21 while the speed of upper rotor shaft 19 has remained the same. The reaction torque of the upper rotor being greater than the lower rotor because of the difference in their speeds, will cause the craft to turn about its vertical axis. Pushing on foot lever 47 with the left foot will reverse the process and the speed of lower rotor shaft 20 will be increased by an amount equal to the speed of gear housing 21, while the speed of the upper rotor shaft 19 has again remained the same and the craft will turn in the opposite direction about its vertical axis. This relative change in speed and hence reaction torque of the upper and lower rotors, with respect to one another, is known as differential speed control and is utilized for steering or directional control of the craft.

Obviously, minor changes may be made in the preferred embodiments without departing from the essence of the invention or the scope of the appended claims. Thus, ball or roller bearings may be employed in place of the sleeve bearings disclosed. Other blades may be employed in place of the pivoted blades shown. It is contemplated that other equivalent mechanical, hydraulic or electrical control movements might be substituted for the one shown without essentially departing from the spirit of the invention.

Having thus described my invention, what is claimed is:

1. A helicopter comprising a supporting frame, a pair of concentric shafts and a bracket construction mounted in said frame, each of said shafts having a rotor unit secured thereto at its upper end, each of said units comprising a plurality of swiveled blades for angular pitch adjustments, said units comprising upper and lower rotors, a sleeve surrounding said shafts in spaced relation thereto and located between said lower rotor unit and the bracket construction, upright cones surrounding said shafts in spaced relation and located between said rotors, said cones having their bases connected in fixed spaced relation to each other and connected to and supported on the outer surface of said sleeve, arms on said blades extending therefrom respectively and into contact with said cones, main gear mechanism interconnecting said shafts whereby said shafts and rotors are rotated in opposite directions, power means operatively connected to said main gear mechanism to drive the same, said bracket construction depending from the top of said frame and connected thereto, an upright tubular member fixed on said bracket and telescopically engaging said sleeve on the inner side thereof, said bracket construction, sleeve and cones being adjustable for limited displacement transversely of said shafts, control means mounted within the frame and connected to said bracket construction to cause displacement of said bracket construction, sleeve and cones transversely and thereby adjust the pitch of said blades sinusoidally to vary the direction of rotor thrust with reference to said frame, a lever pivotally mounted on said bracket construction and pivotally connected to said sleeve to raise or lower said sleeve and cones and thereby change the angular pitch of said blades simultaneously to control the intensity of the thrust of said rotors, in combination with gear mechanism and a shiftable clutch means connected to said main gear mechanism for varying the speed of one rotor relatively to the other rotor for directional control.

2. A helicopter comprising a supporting frame, two concentric shafts mounted in an upright position in said frame, each of said shafts having a rotor unit secured thereto on its upper end, each rotor unit comprising a plurality of swiveled blades for angular pitch adjustment, a sleeve concentrically mounted in spaced relation about said shafts, a pair of cones located between said rotor units and mounted on said sleeve in spaced relation to said shafts, said cones having their bases connected together in spaced relation, arms on said blades extending therefrom respectively and into engagement with said cones, a main gear mechanism interconnecting said shafts whereby said shafts may be driven in opposite directions, in combination with power means to drive said gear mechanism, a movable bracket construction mounted in said frame adjacent the top thereof and secured thereto, said bracket construction having a tubular member fixed thereon and extending upwardly therefrom and telescopically engaging said sleeve on the inner side thereof, control means connected to said bracket construction to cause displacement of said bracket construction, said sleeve and said cones horizontally, thereby adjusting the pitch of said blades cyclically, a lever pivotally supported on said bracket construction and pivotally connected to said sleeve for raising and lowering said sleeve and cones, thereby adjusting the pitch of said blades simultaneously to vary the amount of thrust, of said rotors, in combination with a combined gear and clutch mechanism connected with said main gear mechanism for varying the speed of one rotor relative to the other rotor for directional control.

3. In a helicopter comprising a frame, concentric shafts supported in upright position in said frame, rotor supports secured respectively to the upper ends of said shafts, a rotor unit secured on each of said supports, a plurality of blades swiveled to each support for angular pitch adjustments, a sleeve surrounding said shafts in spaced relation therefrom, two cams mounted on said sleeve in spaced relation to said shafts and disposed between said rotors, an arm on each of said blades extending therefrom respectively and into contact with said cams, a horizontally movable bracket construction mounted in said frame adjacent the top thereof, a lever pivotally mounted on said bracket construction and operatively connected to said sleeve to raise and lower said sleeve and cams to vary the angular pitch of said blades simultaneously differential gearing mechanism operatively connected to said shafts for rotating said shafts in opposite directions, control means in said frame operatively connected to said bracket construction for moving the same horizontally to adjust the pitch of said blades cyclically to provide for varying thrust of the rotors in any desired direction, in combination with a cable, a bellcrank lever and a foot operated lever all located within but adjacent the bottom of the frame, said foot lever being fulcrumed on the floor of the frame and connected by said cable to the bellcrank lever for actuating a reversing gear-clutch mechanism operatively connected with the outer shaft of said concentric shafts for varying the speed of one rotor and its shaft with respect to the other rotor and its shaft for steering control.

4. The construction set forth in claim 3 in which a tension spring is connected to each arm and to a rotor portion to maintain the arm yieldably in contact with its cam.

5. A helicopter comprising a supporting frame, a pair of concentric shafts mounted in said frame and projecting upwardly therefrom, rotary unit supports secured respectively to the upper ends of said shafts, each rotor unit comprising blades swivelly secured on each of said supports for angular pitch adjustments, a sleeve surrounding said concentric shafts and spaced therefrom, two conical cams disposed between said rotor units and secured to the upper end of said sleeve, said conical cams having their bases secured together in spaced relation, said conical cams surrounding said shafts in spaced relation, an arm on each of said blades extending respectively therefrom and into contact with one of said cams, said arms of each rotor all contacting a single cam, a horizontally movable bracket construction mounted in said frame adjacent the top thereof and secured thereto, said bracket construction having a tubular member fixed thereon and extending upwardly therefrom and telescopically engaging said sleeve on the inner side thereof, fluid controlled means mounted on said bracket construction and operatively connected to said sleeve to move said sleeve and cams up or down to change the pitch of said blades simultaneously and thereby vary the amount of thrust of said rotors, main gear mechanism interconnecting said shafts to rotate them in opposite directions, in combination with power means to drive said gear mechanism, control means in said frame connected with said bracket construction to move said bracket construction laterally to adjust the pitch of the blades sinusoidally to vary, at will, the direction of thrust of said rotors relative to said frame, in combination with gear mechanism and shiftable clutch means operatively connected to said main gear mechanism for varying the speed of one rotor with respect to the other rotor for control of the helicopter about its vertical axis.

6. A helicopter comprising a supporting frame, a pair of concentric shafts supported in said frame, rotor supports secured respectively to the upper ends of said shafts, a rotor unit mounted on each of said supports, each rotor unit comprising a plurality of blades swivelly mounted to its support for angular pitch adjustments, geared power operated means interconnecting said shafts for counterrotation of said rotor units, a sleeve surrounding said shafts in spaced relation thereto, said sleeve having a pair of conical cams coaxially secured thereto on the upper end thereof and in spaced relation from said shafts, said conical cams having their bases connected together in suitably spaced relation and located between said rotors, an arm on each of said blades extending therefrom respectively to and engaging one of said cams, said arms of each rotor unit all contacting a single cam, a horizontally movable bracket construction mounted in said frame adjacent the top thereof and connected thereto, said bracket construction having a tubular member fixed thereon and extending upwardly therefrom and telescopically engaging said sleeve on the inner side thereof, a collar connected to the lower portion of said sleeve and arranged concentrically therewith, control means in said frame and connected to said bracket construction to move the same horizontally for adjustment of the blades cyclically to provide for varying the direction of thrust of the rotors, in combination with foot lever operated shiftable clutch means connected to said power operated means for varying the speed of one rotor with respect to the other rotor for directional control of the helicopeter.

7. A helicopter comprising a supporting frame, a pair of concentric shafts mounted in an upright position in said frame, a rotor unit secured on each shaft on its upper end, each rotor unit comprising a plurality of swivelly mounted blades for angular pitch adjustments, geared power operated means interconnecting said shafts for counterrotation of said rotor units, a sleeve movably surrounding said shafts in spaced relation thereto, a pair of conical cams comprising upper and lower cams located between said rotors and mounted about said sleeve on its upper end, arms on said blades extending respectively therefrom and into engaging contact with said upper and lower cams respectively, a horizontally movable bracket construction depending from the top of said frame and secured thereto, said bracket construction having a tubular member fixed thereon and extending upwardly therefrom and telescopically engaging said sleeve on the inner side thereof, suitably mounted control means in said frame and operatively connected to said bracket construction for moving the same horizontally to adjust the pitch of the blades cyclically for varying the direction of thrust of the rotors, fluid operated reciprocating means mounted on said bracket construction and connected to said sleeve for moving said sleeve up or down to vary the pitch angle of said blades simultaneously, in combination with foot operated shiftable clutch and gear means located within but adjacent the bottom of the frame and connected to said geared power means to vary the speed of one rotor in relation to the speed of the other rotor to modify the relatively balanced torque of the rotors and thereby control rotation about its upright axis.

ISIDOR B. LASKOWITZ.

References Cited in the file of this patent

UNITED STATES PATENTS

| Number | Name | Date |
|---|---|---|
| 1,524,309 | Perry | Jan. 27, 1925 |
| 2,394,846 | Cox | Feb. 12, 1946 |
| 2,410,533 | Thomson | Nov. 5, 1946 |
| 2,427,936 | Wales | Sept. 23, 1947 |
| 2,434,276 | Laskowitz | Jan. 13, 1948 |
| 2,437,165 | Locke | Mar. 2, 1948 |
| 2,448,073 | Bendix | Aug. 31, 1948 |
| 2,493,042 | Stalker | Jan. 3, 1950 |

FOREIGN PATENTS

| Number | Country | Date |
|---|---|---|
| 610,434 | Germany | Mar. 12, 1935 |